Patented May 30, 1950

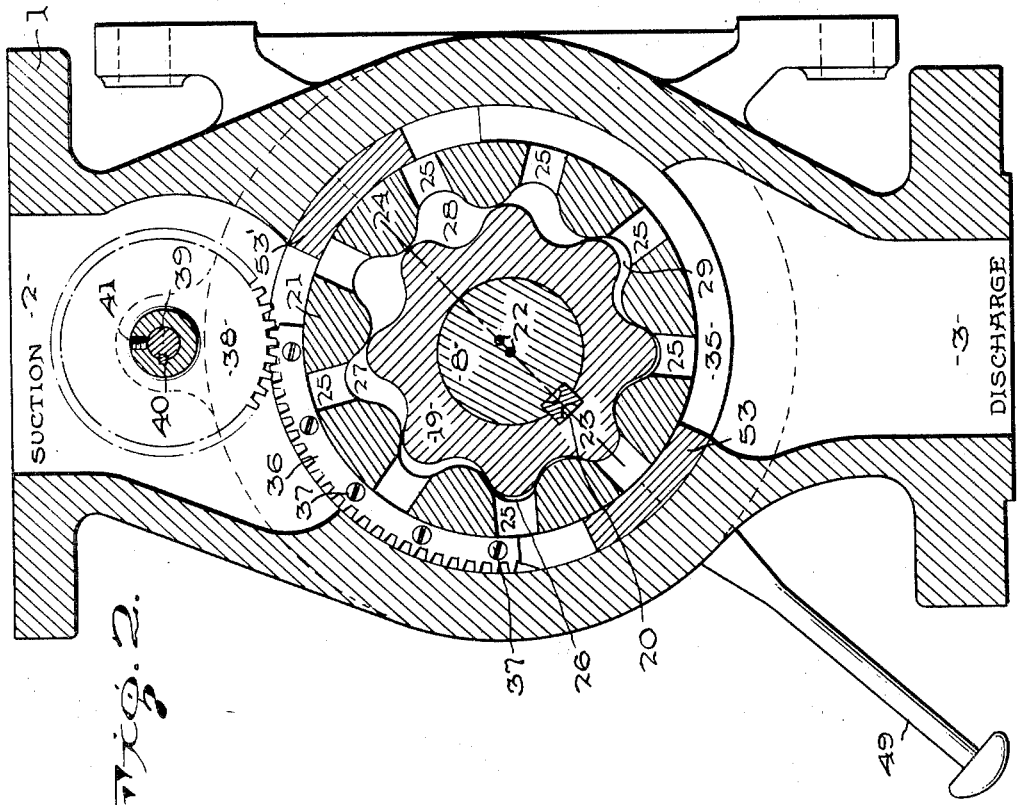
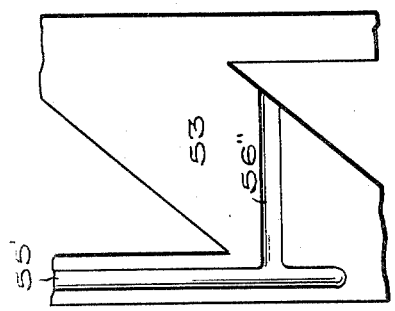

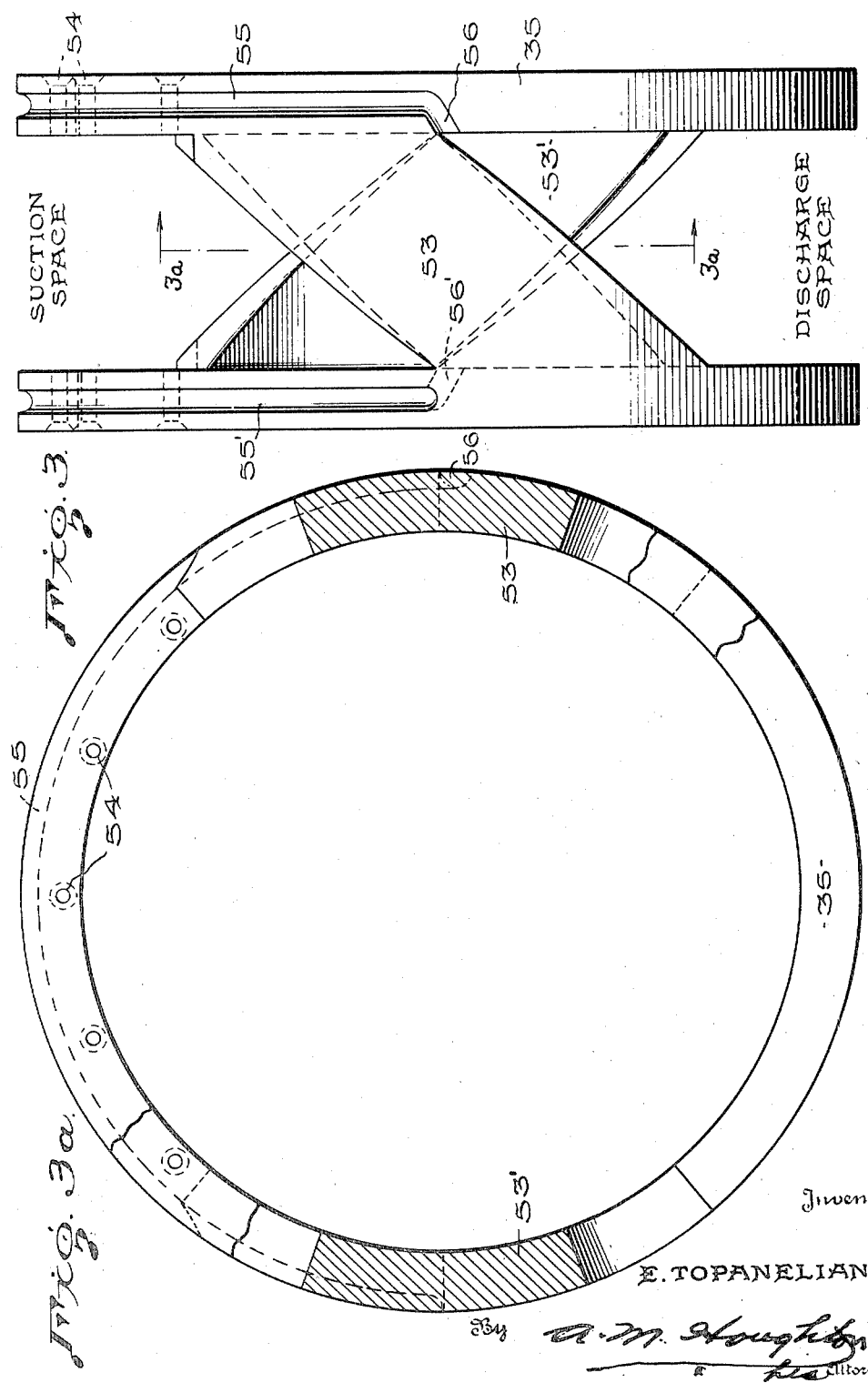

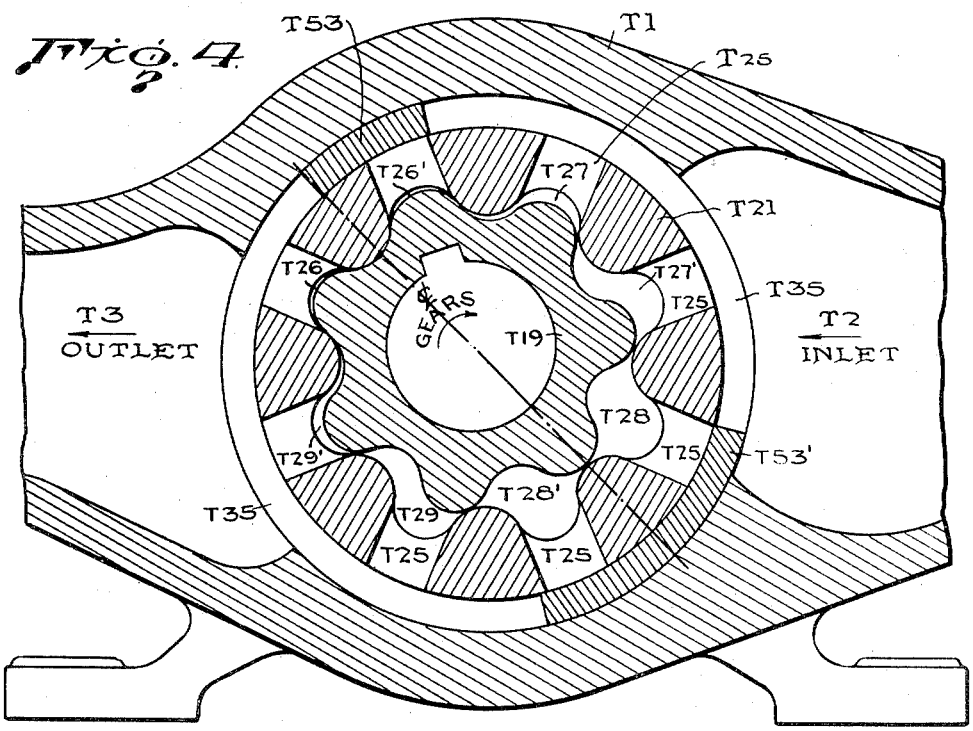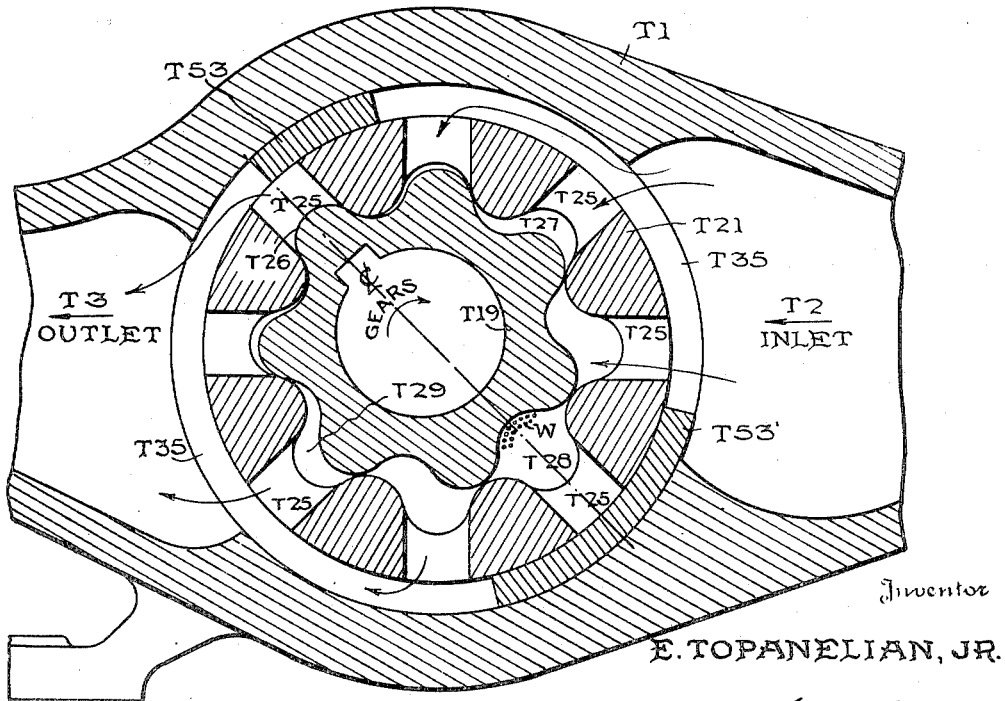

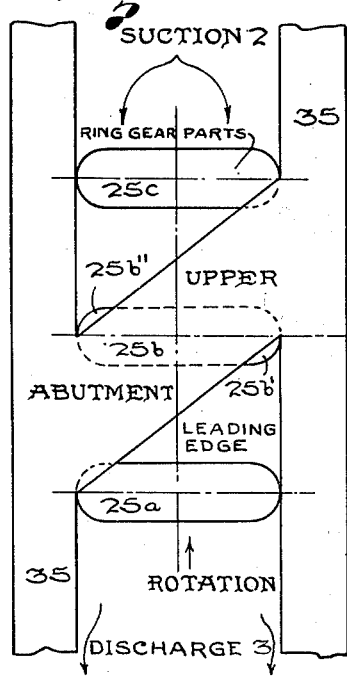
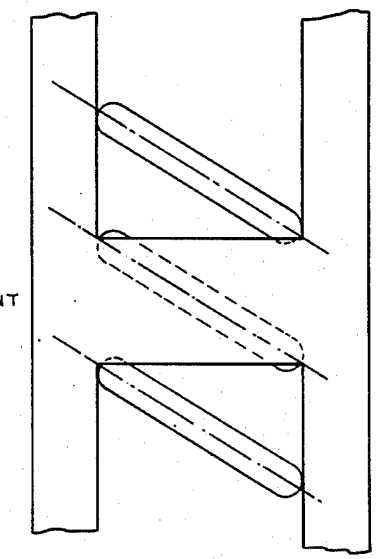
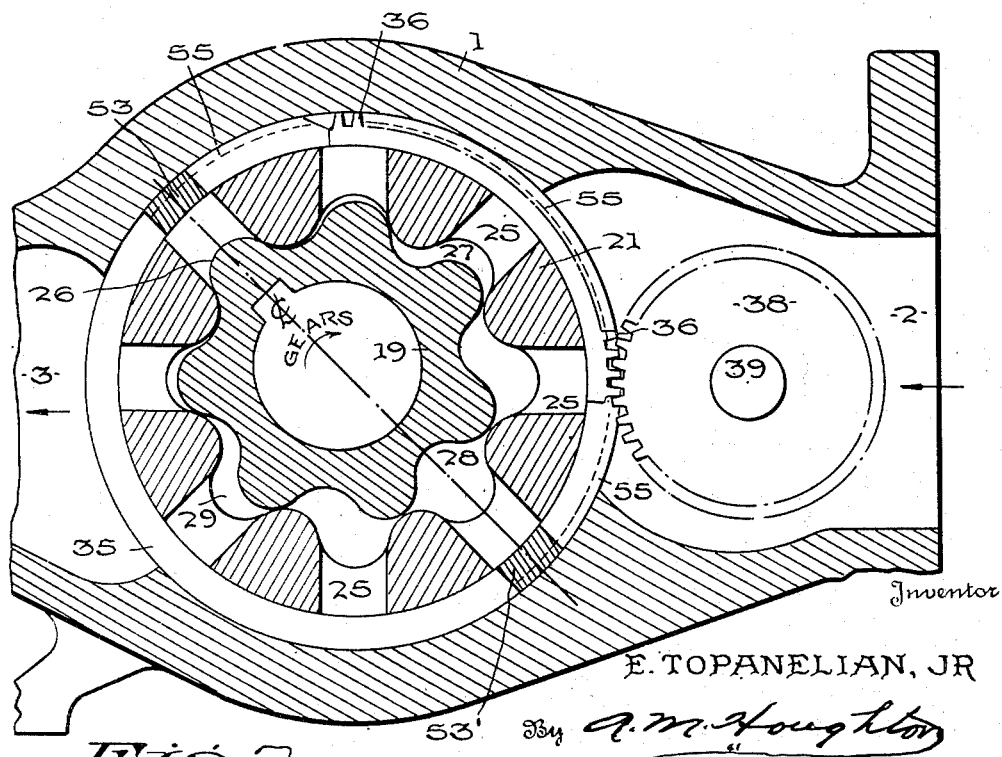

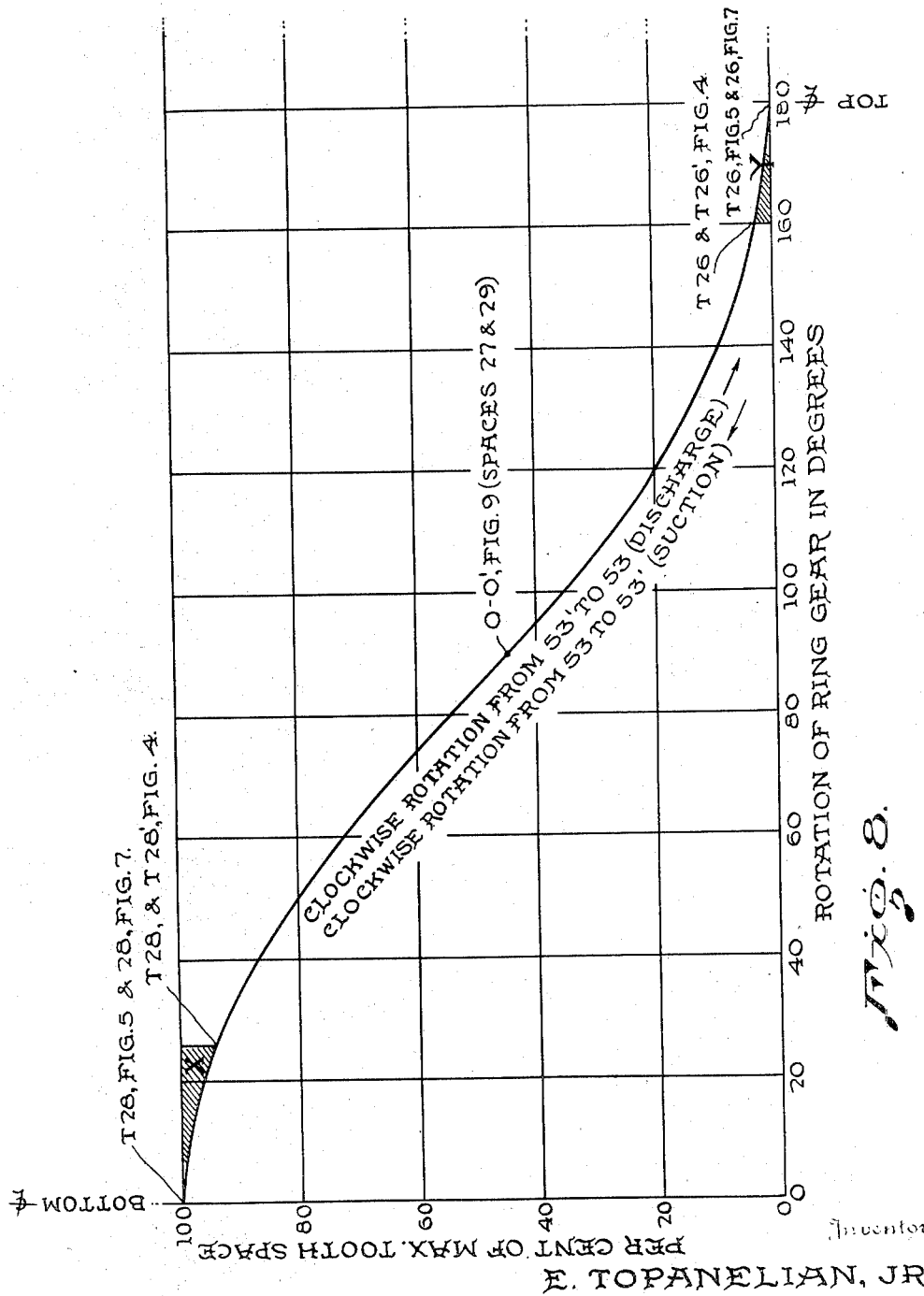

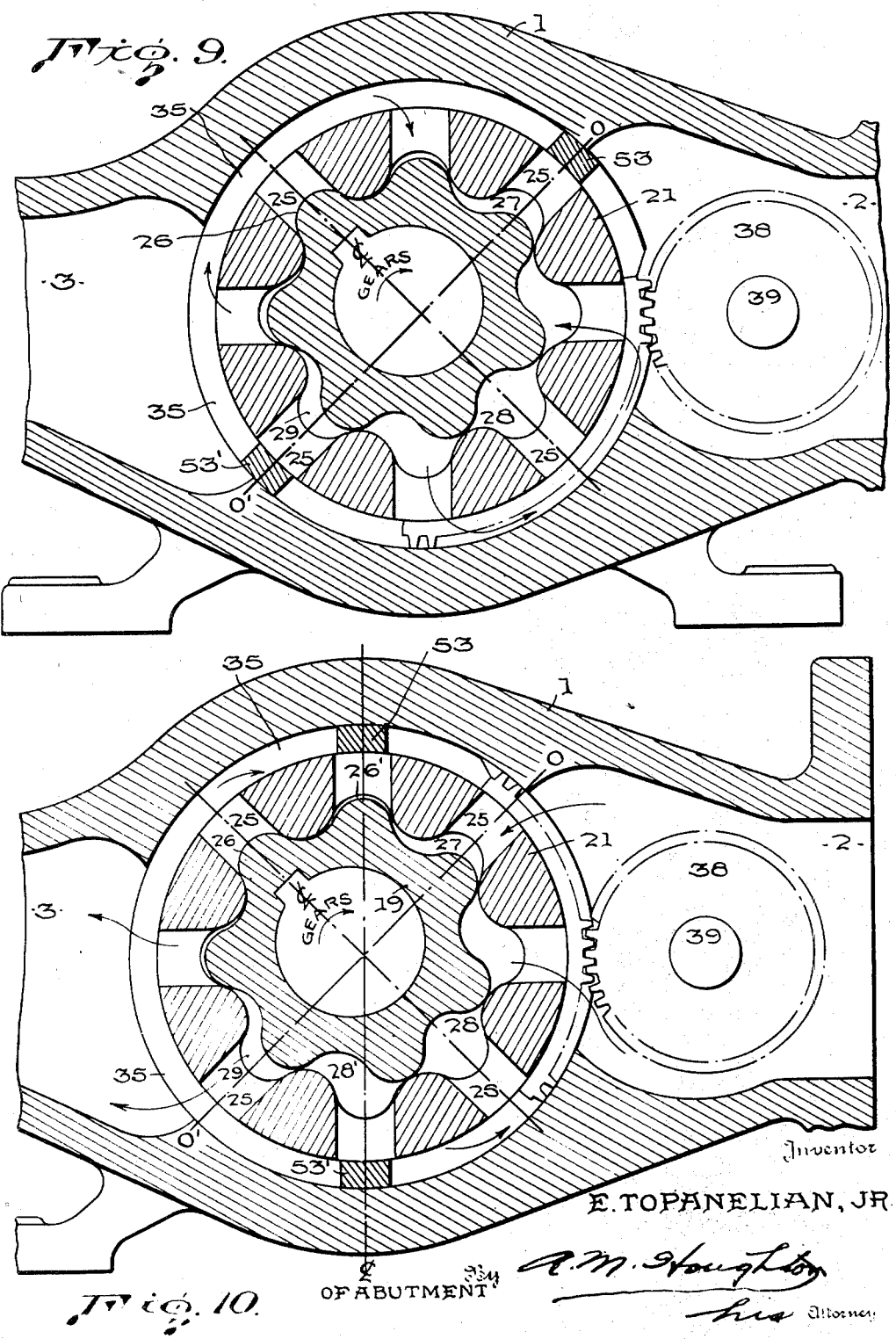

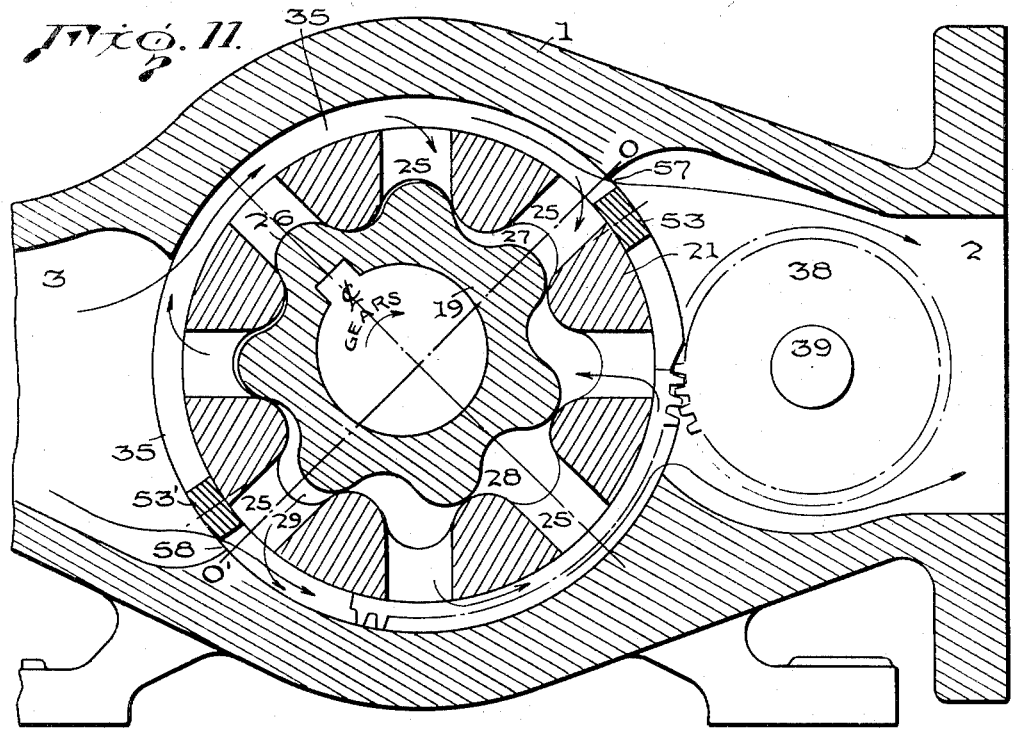
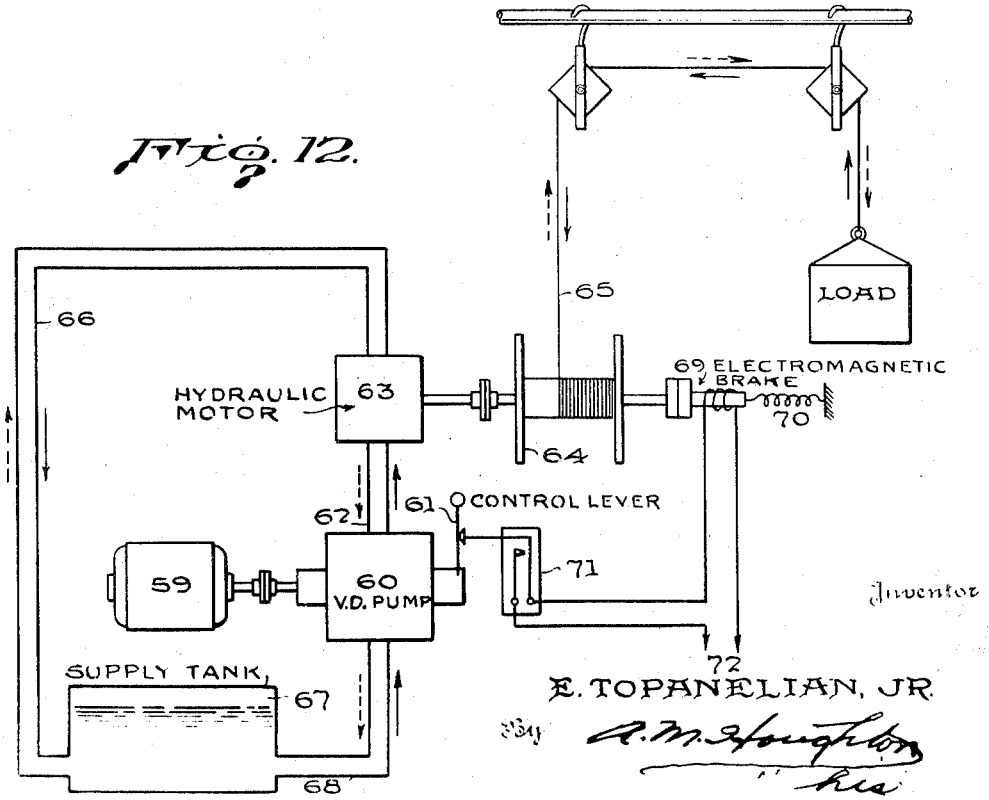

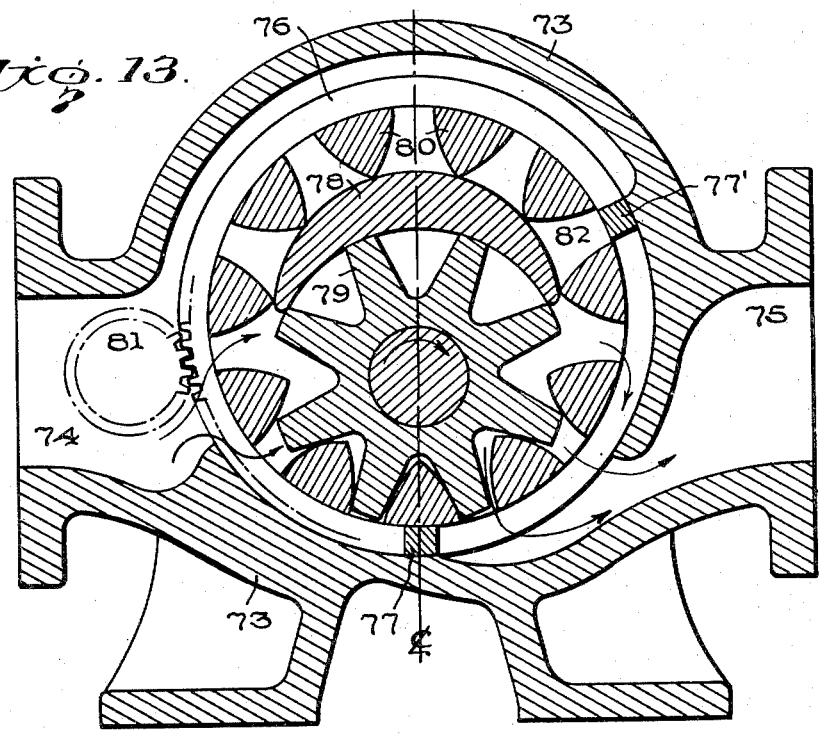
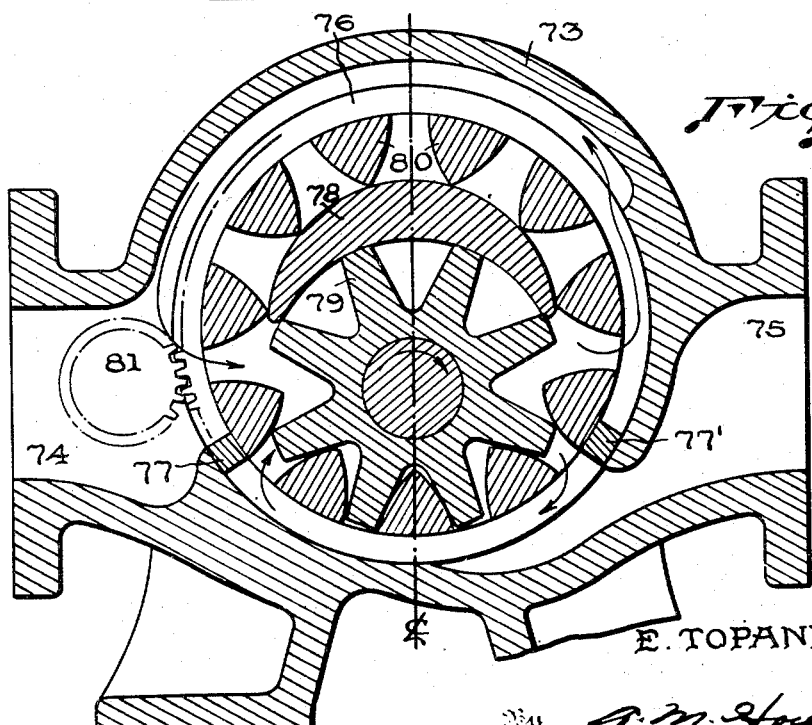

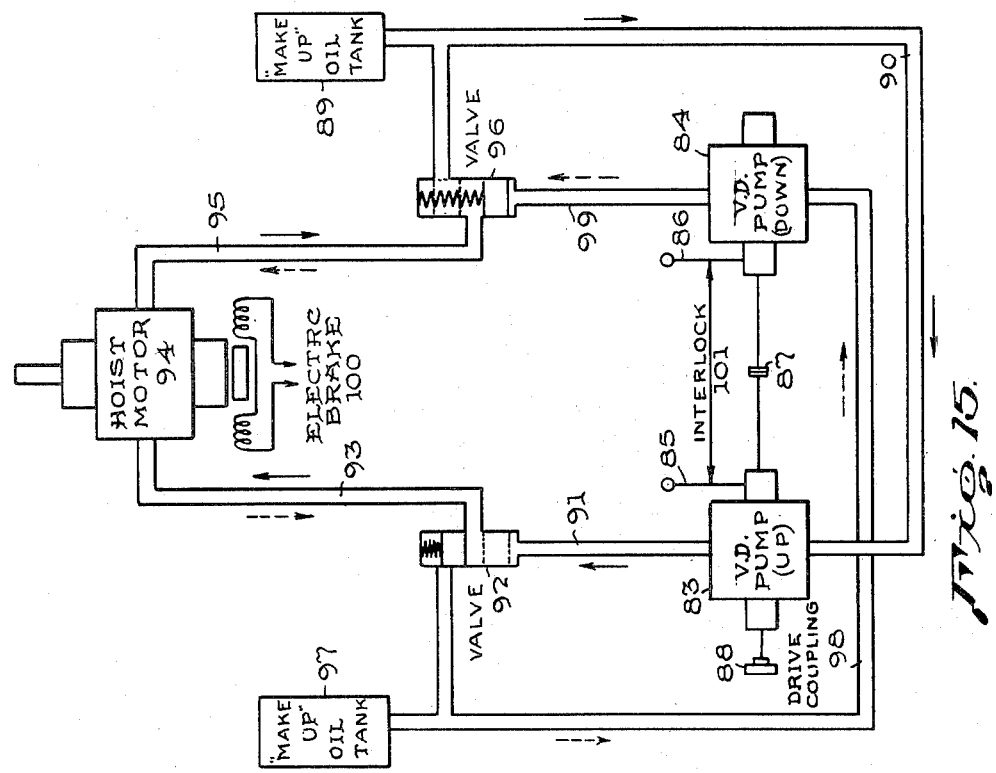
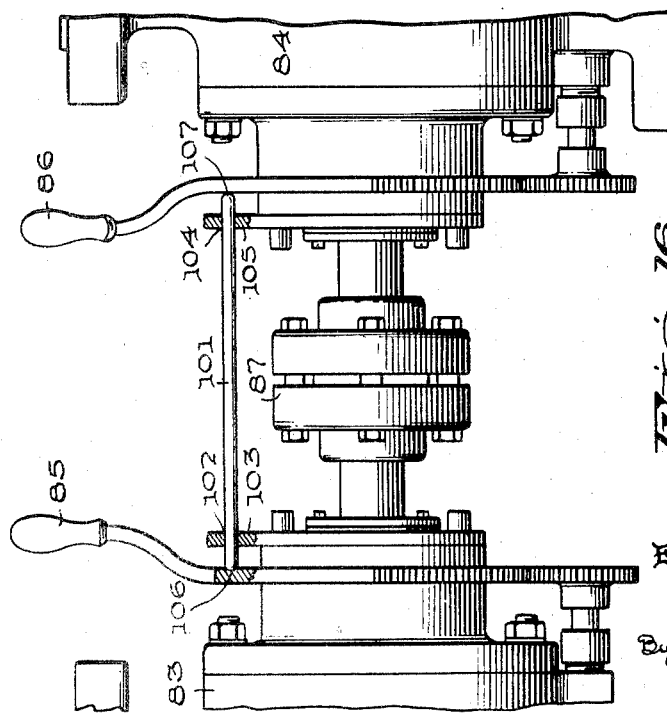

2,509,321

UNITED STATES PATENT OFFICE 2,509,321

ROTARY FLUID UNIT FOR TAKE-OFF UNDER VARIABLE CONTROL

Edward Topanelian, Jr., Pittsburgh, Pa., assignor to Gulf Research & Development Company, Pittsburgh, Pa., a corporation of Delaware Application July 19, 1946, Serial No. 684,994

13 Claims. (Cl. 60—53)

This invention relates to pumps, compressors and motors of the rotary type for general use and application in fluid power systems, particularly those in which variable control of the flow of power is desired, such as in hydraulically operated hoists and fluid transmissions where variation of the power output is obtained by control of the flow of fluid medium at some point in the system. It also has application to fluid metering systems where accurate proportioning of fluid mixtures is obtained through control of fluid flow from several sources, usually by variable volume proportioning pumps.

The invention comprises several means for control of the input and delivery of fluid to and from the volumetric elements of a fluid unit, universally known as the rotary internal gear type, more particularly those in which the gears comprise a mating pair wherein the number of teeth in the external or ring gear exceeds the number of teeth on the internal or pinion gear by one, but may also be applied to those having a two or three tooth difference. It has for a principal object the provision of a pump or compressor unit which is simple, compact, and the output of which is readily adjusted or controlled by a lever or other means, external to the pump, in direct mechanical linkage with the controlling member in the pump, so that the position of each is definite with relation to the other at any position of either, regardless of the rapidity with which the control handle is moved. This is an important feature because in those systems where reversal of flow is required, which is obtained by means of a reversing or transposing valve, or by means of two pumps each supplying fluid for operation in the opposite direction, it is sometimes essential that the output of the pump be reduced to zero before reversal of other devices in the system occurs, especially in the case of the reversing valve which in some cases must be mechanically linked to the control handle of the variable volume unit so that when reversal is made with the valve the pump volume control handle is required to return to off or no-delivery position at the moment the reversing valve passes through its neutral position. Where a direct mechanical linkage, such as the subject of the present invention, does not exist, the internal parts of the pump controlling the flow will often lag behind the movement of the external parts so that there is no assurance that the pump delivery will be zero at the proper time.

A further object of this invention is to provide a means of separating the pump discharge from the pump suction which will not cause cavitation or trapping or undue noise regardless of the position at which it is placed circumferentially around the gears relative to the line of eccentricity passing through the rotational centers of the internal and external gears respectively.

A further object is to provide a means of lubricating or balancing parts of the control mechanism which must be moved for purposes of control, but which are not in continuous motion and are subjected to severe pressure or thrust in a direction which tends to squeeze out the lubricating film between the parts and make them difficult to move. The object is to accomplish this without introduction of additional parts or mechanisms such as rollers.

Another object is to provide a variable control means which is smooth and continuous from maximum delivery down to and including zero delivery in contrast to methods which provide variations by steps or must be operated with a certain minimum delivery greater than zero under low discharge pressure approaching zero discharge pressure.

Another object is to provide a means of separating the pump discharge from the pump suction in such a way that advantage may be taken of the maximum displacement of the gears for maximum delivery of the pump.

A further object is to provide a means of separating the discharge of the pump from the suction of the pump in such a way that if fixed maximum delivery is desired, same can be obtained with the gears rotating in either direction without the necessity of altering the location of the abutments or similar compensating adjustment. This also would apply to some abutment positions other than that for maximum delivery. This is a distinct advantage over other pumps in which the abutments must be shifted to avoid trapping when rotation is reversed.

Another object is to provide means of removing the barrier between suction and discharge of the pump at will and subject to variable control of the amount so that flow of fluid may take place between suction and discharge and vice versa and the amount of said fluid flowing will be subject to control without relation to the rotation of the pump gears. This is of particular advantage when using a single variable volume pump unit to supply power oil in a hydraulic hoist transmission, where the weight of the load is sufficient to cause rotation of the hoisting drum in a direction to lower the load, thus reversing the hydraulic hoisting motor and forcing reverse circulation through the variable volume pump unit, when said reversal of flow is permitted by the means of this invention. Under these circumstances the use of a second power pump to lower the load is eliminated.

Another object is to accomplish variation of delivery without altering the eccentricity of the gears or moving the gears in and out of mesh either radially or axially, both of which present mechanical difficulties and complicate the construction.

Another object is to provide a simple means of interlocking the controls of two variable volume pumping units, where one is used for delivery of fluid in the opposite direction from the other for purposes of reversing a hydraulic mechanism, so that both cannot be operated at the same time.

It is understood that this invention applies in principle primarily to those rotary fluid units known as radial ported, including compressors, air, steam, or gas motors, and of course, oil pumps.

For a more detailed understanding of this invention, reference will be made to the accompanying drawings illustrating one preferred construction adapted for use in a rotary pump having an internal-external gear combination, wherein the external or ring gear is provided with radial ports and with a number of teeth greater by one than the number of teeth on the mating pinion or internal gear, which is chosen for an example. However, the invention is not to be construed as limited to the particular construction shown or limited to the particular pump design chosen for illustration.

In the drawings:

Figure 2 is a transverse vertical sectional view of the pump assembly;

Figure 3 is a side view of the rotatable sleeve, showing the arrangement of abutments and pressure balancing grooves;

Figure 3a is a vertical sectional view of the rotatable sleeve in a plane intermediate its ends as indicated by line 3a—3a in Figure 3;

Figure 3b is a fragmentary view of a modified groove configuration in the rotatable sleeve;

Figures 4 and 5 are simplified sectional views of a standard gear pump of the internal type, illustrating the manner of its operation;

Figures 6 and 6a are, respectively, developed views of different forms of movable abutment for various types of ring gear ports;

Figure 7 is a simplified sectional view of a pump provided with movable abutment control means;

Figure 8 is a chart wherein the curve represents the variation in tooth space on the discharge side when read downward, and on the suction side when read upward;

Figures 9, 10 and 11 are simplified sectional views showing the movable abutments positioned for no net flow, for reduced discharge, and for controlled reverse flow, respectively;

Figure 12 is a schematic showing of the application of a variable volume pump to a hydraulic hoist;

Figures 13 and 14 are simplified sectional views of the invention as applied to a type of pump of more than one tooth difference, showing the abutment in power transmitting and neutral positions, respectively;

Figure 15 is a schematic showing of a hydraulic hoist system adapted for positive application of power in both raising and lowering, and for such purpose employing variable volume pumps in tandem;

Figure 16 is a side view of the tandem-connected pumps with means for locking the control lever of one in a neutral position when the other pump is on discharge.

Figure 1:
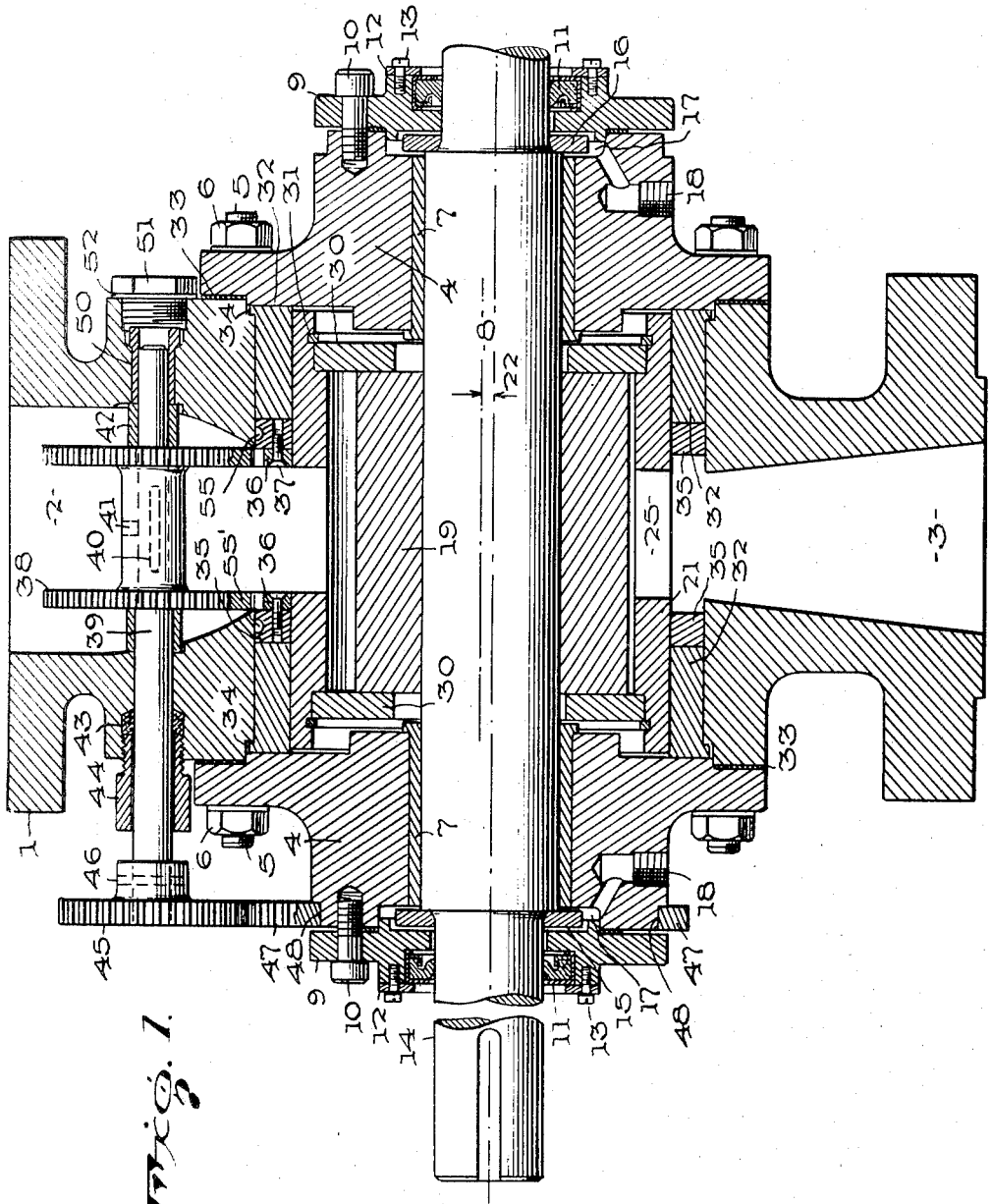
Figure 1 is a longitudinal vertical sectional view of a pump assembly embodying the novel control means.

Referring first to Figs. 1 and 2, the subject invention is shown applied to a typical pump, comprised as follows: 1 is the main or center housing having suction port 2 and discharge port 3. The ends of the pump are closed by end housings 4 attached to the main housing with studs 5 and nuts 6, said end housings being provided with bored holes into which are pressed sleeves 7 of bronze, babbitt-faced steel or other suitable material to support the shaft 8 which turns within these bearings. The end housings are each fitted with an end plate 9 secured to the end housing with cap screws 10 and provided with suitable shaft seals 11 to seal the shaft against leakage, and these are held in place with seal retainers 12 and screws 13. The shaft 8 may be provided with an extension 14 at one or both ends if desired for motor drive or for mounting of a coupling for driving from either end or connecting in tandem to a second pump unit so that both may be driven by one motor. The shaft 8 is provided with buffer plates 15 and 16 so arranged that contact between buffer plate 15 and end plate 9 will prevent more than nominal movement of the shaft to the left; and similarly, buffer plate 16 will prevent more than nominal movement to the right, thus positioning the shaft longitudinally. It should be noted that bearing bushings 7 not only support the shaft 8 with a running fit, but due to the close fit and the length of these bushings, they also serve effectively as leakage bushings to restrict the flow of high pressure liquid from the interior of the pump out along the shaft. Only a limited amount of oil therefore will collect in pocket 17; and to prevent an eventual build-up of high pressure against the shaft seal, a drain connection 18 is provided which is used to remove excess leakage from pocket 17 and it may be allowed to run out into the open or may be conducted by tubing to the suction of the pump or to a supply tank.

At the longitudinal center of the shaft, a pinion gear 19 is located with a press fit which will keep it from moving longitudinally with respect to the shaft, and a key 20 which will keep it from rotating relative to the shaft. Pinion gear 19 is in mesh with and drives an internal or ring gear 21 which has a number of teeth greater by one than the number of teeth on pinion 19 in the example chosen. The imaginary center of rotation of the ring gear is eccentric with respect to the center of the pinion shaft by a distance 22 equal to one-half the tooth height of the gears so that at point 23 they are in full mesh and at point 24 they are completely out of mesh, but at the latter point the tooth tips are in very close proximity to each other, being separated only by a running clearance of a few thousandths of an inch, dependent on the size of the pump. The ring gear 21 is provided with radial ports 25 through which liquid may enter and leave the tooth spaces such as 26, 27, 28 and 29, formed between the gears. The ends of the tooth spaces between the gears are sealed with side plates 30 fitted tightly into the ends of the ring gear and held in place by retaining rings 31, and these side plates have running clearance with pinion 19.

Since, owing to the different number of teeth on the two gears, there is a relative rotation between the two, these side plates 30 also serve to position ring gear 21 longitudinally since they determine its position relative to that of the pinion 19 which is pressed on shaft 8, the latter being restrained longitudinally by buffer plates 15 and 16.

In one standard form of pump as illustrated, the eccentricity is obtained by restraining the ring gear with running fit in the main pump housing bore or in a sleeve pressed into this bore. The end housings are mounted concentric with the main housing bore, and the bearing bushing bore within them is eccentrically located so as to maintain the shaft and pinion in the proper eccentric relationship with the ring gear. In the application of the subject invention to this typical pump, the construction up to this point parallels that of a standard pump. I will now proceed to describe the parts comprising the subject invention, as essential to completion of the pump in such a manner as to accomplish the various objects previously described. To continue with the description applying to the subject improvements, the ring gear 21 is positioned by a running clearance in two bearing sleeves 32 which are a push fit in either end of the main bore of housing 1. These are provided with babbitted inner faces or are otherwise of suitable material to provide substantial bearings for the gear 21. Sleeves 32 are retained snugly in position by end housings 4 which are sealed against housing 1 with gaskets 33 of compressible material, and are restrained from displacement inwardly by shoulders 34, and these bushings are by the means shown clamped tight so as to resist rotation, in effect becoming part of the housing. In the space remaining between sleeves 32, the circumference of gear 21 and the main housing bore, sleeve 35 had been inserted during assembly and this sleeve has running clearance in housing 1, running clearance on ring gear 21 and running clearance between sleeves 32 so that it may be rotated freely. Details of sleeve 35 (including details of oil grooves for balancing) will be further described by later reference to Fig. 3. To continue with other essential construction, gear segments 36 are attached to the sleeve 35 with screws 37 or by other means. Gear segments 36 mesh with the twin-gear 38 mounted in the suction port 2 on shaft 39 which extends through suitable openings in housing 1. Gear 38 is secured to shaft 39 by key 40 and set screw 41, and the assembly is properly located in port 2 by spacer collars 42. Shaft 39 extends through packing 43 and packing nut 44 to prevent leakage of air into the suction port along the shaft. Gear 45 is pinned to the outer end of shaft 39 with pin 46 and is in mesh with a toothed portion of the gear segment 47 which is mounted rotatively in groove 48 formed between the end housing outer shoulder and the end plate 9. Handle 49 (Fig. 2) is suitably attached to gear segment 47 at a convenient location on the circumference of the latter so that a convenient means is provided by movement of handle 49 to rotate gear segment 47 and in turn gear 45, shaft 39, gear 38, gear segments 36, and thereby cause rotation of sleeve 35 to desired positions relative to the main housing and to the line of eccentricity 23—24 of the gears. The lever may also be equipped with pawl and ratchet plate or other means of holding position. The results and effects desired to be achieved by this rotation of sleeve 35 will be described later in detail.

To complete the assembly, 50 is a guide bushing, 51 a plug and 52 a gasket, which last three items are made to fit into the shaft hole and packing gland openings on either end of the pump when said end is not being used for the extension of shaft 39, bearing in mind that the details associated with shaft 39, gear segment 47 and shaft 8 are all intended to be arranged so that the pump may be assembled for drive or control from either end.

Referring now to Fig. 3 for further details of the rotatable sleeve 35, the inner surface of the sleeve is tinned with babbitt so as to ride or rotate freely around the ring gear. The ring gear does not bear on this sleeve but is carried on the cylindrical bearings 32, which have a slightly smaller internal diameter than the sleeve 35. The outside of sleeve 35 is made a close sliding fit in the pump housing so that it is positioned radially by this fit. It will be further seen that portions of the sleeve are cut away to form suction and discharge spaces which will provide communication between the ring gear ports and the suction and discharge passages in the main pump housing. While portions of the sleeve are cut away, two ligaments, or webs, 53 and 53' are left in the central portion of the sleeve so as to form abutments between the suction and discharge spaces. These abutments 53 and 53' are shown located diametrically opposite each other and of diagonal form. This is the preferred construction for the type of pump described, but it is to be understood that abutments may be arranged to accomplish the same purpose with somewhat different form or shape, to suit certain other constructions or other gear designs, as for example those hereinafter described with reference to Fig. 6a. Continuing with the description of Fig. 3, rivet or screw holes 54 serve for attachment of the gear segments 36 by screws 37, although the gear segments might equally well be made integral with the sleeve member or might be riveted or welded to it. Fluid grooves 55 and 55' are provided for balancing and floating the sleeve against the radial thrust toward the suction side, arising from the pressure of fluid in the discharge space acting against the adjacent faces of the abutments. These balancing grooves are essential to prevent the sleeve from "sitting down" against the suction side of the housing, which would make it almost impossible to rotate the sleeve because of destruction of the lubricating film. Grooves 55 and 55' are shown extending around the outer periphery of the sleeve on the suction side for approximately 180 deg. of arc and approximately from and to the centerlines of the two abutments. These may be extended further or less, as found necessary by experience, to provide the exact amount of balance required for any particular design. The amount of balance may also be controlled by the width and depth of the grooves and/or of the feeder grooves 56 and 56' which connect one end of each groove to the discharge space. Control of the balance may be obtained by varying the depth, width and location of feeder grooves 56 and 56'. Further control of the balance may be obtained by extending the grooves 55', as in Fig. 3b, and connecting 55' by another feeder groove 56'' to the discharge space, thus feeding discharge fluid under pressure to both ends of the groove. By bringing the feeder groove 56" across the outer periphery of the abutment, some balancing pressure may be obtained between the periphery of the abutment and the pump housing. These variations are described to show that as anticipated the arrangement of balancing grooves will not be limited to that shown in Figs. 3 or 3b as examples. It should be understood that the function of these grooves is to distribute fluid under pressure to the outer faces of the sleeve in a controlled manner so as to float the sleeve against the action of pump discharge pressure and achieve the balancing pressure in proportion to the discharge pressure so that the sleeve may be easily rotated at all times. This is accomplished automatically by the means described since the balancing fluid pressure derives from the discharge pressure.

In order to make clear the performance of my invention, I will first describe the pumping action of a typical standard fixed volume pump of related design, the reference numerals of the various parts being similar to those used in describing the present invention, but preceded by the reference letter T. I will then show how specific alterations or substitutions in the design, as herein described, will cause the pump to perform in a different manner so as to successfully obtain the objectives and advantages claimed herein:

Referring to Fig. 4, we have a simplified cross-section of a typical standard pump of the type known as rotary and having as the pumping element a pair of gears known as the internal type, in which the pinion, or central gear T19 has a number of teeth which is less by one than the number of teeth on the mating or external gear T21, and said external gear being of the type known as radial ported. For convenience, the ring gear in Figs. 4, 5, 7, 9, 10 is shown with an even number of teeth. The ring gear T21 rotates within a cylindrical sleeve T35 which is pressed into the main pump housing and which has cut-out portions communicating with the suction and discharge passages in the main pump housing, T1. Separating the cut-out portions of the sleeve in such a manner as to form a barrier to the communication of fluid between the main suction and discharge passages, the remaining ligaments, referred to in the art as abutments, are indicated in the sketch as T53, sometimes called the upper or discharge abutment, and T53', sometimes called the lower or suction abutment. It will be seen that the gears are mounted so that their geometric centers of rotation are eccentric to each other and that, with the direction of rotation indicated, the leading edge of abutment T53 is located approximately on the centerline drawn through the gear centers, and the body of abutment T53 extends clockwise therefrom for a clockwise rotation of the gears. It will be seen that abutment T53' is designed to cover two ring gear ports and is approximately bisected by the centerline drawn through the gear centers. This described arrangement represents the typically used construction hitherto considered to be essential to the proper performance of this type of pump and as commonly used therein.

In operation, the functions of this type of pump will be seen to be as follows:

With the gears rotating clockwise, as shown, it will be seen that spaces formed between the teeth on the suction side are increasing in volume as they approach the centerline; thus, tooth space T28 is greater than tooth space T27' or T27, and by reference to Figs. 5 and 8, T28 is at a maximum when on the centerline. In Fig. 4, the tooth spaces on the discharge side are decreasing in volume; thus space T29 is less than space T28' and so on. To further describe the action in Fig. 4, fluid in the suction passage enters the increasing void in space T27 through radial port T25 and continues to do so through position T27' and up to the position of T28. At this position, space T28 and port T25 are filled with fluid, but further entrance of fluid from the suction passage will be prevented because port T25 is now sealed off by the leading edge of abutment T53'. The angular position of the gears, when space T28, port T25 and the leading edge of abutment T53' are thus co-related, at the exact instant when further entry of fluid to T25 is prevented, is commonly known as the position of cut-off. This is approximately shown in Figs. 4 and 8. Referring for a moment to Figs. 5 and 8, it will be seen that space T28 further enlarges as it moves from the point of cut-off to the centerline. Since no fluid can enter during this period (leakage neglected), space T28 will not only contain fluid but also a certain percentage of vacuum, or of gas or air extracted from the fluid at reduced pressure (see W in Fig. 5). It will be seen in Figs. 4 and 5 that with the construction shown, flow of fluid from the high pressure discharge to the suction side of the pump is prevented not only by abutment T53' but also by the close proximity of the tips of three pairs of gear teeth in Fig. 4, and two pairs of gear teeth in Fig. 5. When operating at high discharge pressure, a slight leakage will occur past these gear tooth tips. Therefore, space T28 will receive a slight amount of additional fluid as it continues to move from the point of cut-off. In common practice, the trailing end of abutment T53' must be so located that the ring gear port will be uncovered to discharge at the exact instant when the remaining void in the tooth space has been eliminated; in other words, (in Fig. 4) when the volume T28' plus T25 is equal to the volume T28 plus T25 plus the leakage which has passed into T28 by the time it has reached position T28'. If this is not done, trapping may occur, or a sudden collapse of the remaining void may occur, either of which causes great noise and destructive vibration in the pump.

Since, as above described, the tooth space T28, when at its maximum in the position shown in Fig. 5, is not completely filled with fluid, and since the total delivery of the pump is composed of the summation of the maximum amount of fluid delivered by the individual tooth spaces, it will be seen that in the existing state of the art advantage cannot be taken of the maximum possible displacement of the gears. It will be shown later that my invention does take advantage of the maximum displacement.

To continue with the function of a standard pump as is shown in Figs. 4 and 5, if the gears continue to rotate in the direction shown the tooth spaces continue to diminish in volume, as in the positions T29 and T26 and fluid is forced therefrom through ring gear ports T25 into the discharge passage T3 of the pump. This action continues until the ring gear port reaches the position shown in Fig. 5, at which point the tooth space T26 is on the centerline and is at a minimum (see also Fig. 8). Theoretically, abutment T53 would be arranged to seal off port T25 at this position, but experience has shown that the pump will be noisy due to trapping if a slight time lag is not introduced. Therefore, the leading edge of abutment T53 is preferably placed at the centerline in some high pressure pumps. As rotation continues, abutment T53 continues to seal port T25 approximately to the position shown in Fig. 4, at which time a small tooth space T26', which is under vacuum, or is filled with gas or air extracted from the fluid remaining in port T25, has been created (see also Fig. 8). This is not harmful to the operation of the pump if not carried too far; however, it does reduce the time available for filling the tooth spaces. Abutment T53 is commonly extended around for a considerable distance in order to provide a sufficient seal against leakage around the periphery of the ring gear.

I will later show how my invention eliminates the wasting of space T26' and provides maximum possible filling time.

I will now describe the performance and function of a pump designed in accordance with my invention, in contrast to the above present art. Referring to Fig. 6, I show a simple and, in the case of the particular design of pump used to demonstrate this invention, a preferred construction for the upper and lower, or discharge and suction, abutments. Fig. 6 shows a developed section of the ring gear sleeve, previously described and shown in Fig. 3, and includes that section of the sleeve adjacent to the upper abutment, 53. This developed view of the sleeve and abutment is superimposed upon a developed section of the ring gear periphery, including three of the radial ports, 25a, 25b and 25c. In this simple preferred construction it will be seen that the abutment assumes a diagonal shape with dimension and position such that its leading edge (that is, the edge which is first approached by the ring gear port when rotated in the direction shown) is defined by a line drawn from the extremity of the centerline of one ring gear port as 25a to the opposite extremity of the centerline of the next ring gear port, as 25b; and the lagging edge of the abutment is defined by a line drawn from the opposite extremity of the centerline of ring gear port 25b and extending geometrically parallel with the leading defined line to the alternate extremity of centerline of the third ring gear port 25c; in other words, approximately a 45 degree spiral abutment, in this particular pump, with a peripheral width equal to the port spacing. It will be seen that an essential feature of this abutment provides that, when the ring gear port axial centerline, as of 25b, is coincidental with the axial centerline of the abutment, a very small portion 25b'' at one end of the ring gear port 25b is in communication with the suction passage 2, while a small portion, 25b', of the opposite end of the ring gear port 25b is uncovered to the discharge space 3. This is an important feature because the ring gear port can thus never be completely sealed to both suction and discharge at the same time by this abutment. Therefore, fluid can always flow either into or out of the ring gear port and tooth space, or it can do both at the same time. With this arrangement there can be no trapping and no cavitation in the pump teeth caused by the abutment. A further essential feature is accomplished by the arrangement shown, in that a considerable abutment width is provided to seal around the periphery of the ring gear between the suction and ring gear passages. Furthermore, at the centerline position when no apparent mechanical seal exists against the flow of discharge fluid from 3 into the port at 25b' and out of the port at 25b'', to suction 2, actually the instant at which this relationship exists during rotation of the pump is so slight that the inherent compressibility of the fluid or the effect of lag due to fluid inertia effectively prevents appreciable transfer of the fluid from the pressure side 3 to the suction side 2; and this effect is utilized to the utmost advantage in the abutment design above described, because the uncovered portions 25b' and 25b'' of the ring gear port, as 25b, are at opposite extremities of its centerline. This same effect will not be obtained, for instance, by the use of an ordinary rectangular abutment having a peripheral width less than that of the ring gear port. Such an abutment would not provide a sufficient time lag for an appreciable resistance to fluid flow by inertia because the distance is relatively short, and furthermore would not provide an effective peripheral seal. A further advantage of the diagonal construction and/or approximations of the diagonal construction, is its contribution to quiet operation of the pump. In pumping fluids containing entrained air, also when an abutment is located at an angular position corresponding to maximum rate of discharge from the ring gear teeth, there is a tendency to set up noise and vibration in a pump due to sudden collapse or release of air bubbles and/or sudden interruption or release of fluid flow from the ring gear ports as controlled by the leading and lagging edges of the abutment which may be said to act as a valve in opening and closing the ring gear port. My abutment eliminates or minimizes these noisy and vibratory effects by providing a gradual closing and gradual opening of the ring gear port, similar to the action of a slow opening valve in reducing hydraulic hammer or shock. It is understood annd claimed that these same effects and advantages may be obtained with different abutment and port shapes in other designs, as for instance a straight abutment in combination with a spiral ring gear port as shown in Fig. 6a.

Figs. 6 and 6a show the action at the upper abutment 53, and the action at the lower abutment 53' would be exactly similar except the travel of the ring gear ports relative to the abutment would be reversed; e. g. from suction 2 to discharge 3.

In my invention both the upper and lower, or discharge and suction, abutments 53 and 53' are provided with the basic features described above, and it will be seen that if used on a standard fixed volume pump the abutments would be symmetrical, and therefore the pump would be reversible since the abutments would be placed symmetrically at the extremities of the centerline of gear eccentricity, or in other words at the points of maximum and minimum tooth space volume (see position shown in Fig. 7). It will be further shown that by the use of my abutments, advantage is taken of the maximum possible displacement of the gears. Referring to Fig. 7, I show a schematic cross-section of a pump arranged in accordance with my invention, in which, for the sake of clarity, the abutments 53 and 53' are shown with an imaginary width less than that of the ring gear ports 25 so as to represent their function of sealing peripherally between discharge and suction while at the same time emphasizing that they do not block the ring gear ports. As previously described, an abutment actually made as shown in Fig. 7 does not fulfill all the requirements of my abutment, but the latter cannot be clearly shown in this view. It will be seen by comparing Fig. 7 with Figs. 4 and 5 that fluid will continue to enter port 25 and space 28 until 28 reaches its maximum volume at the centerline, at which time abutment 53' will provide an instantaneous seal, as previously described, and thereafter fluid will be expelled from 28 and 25. This will continue until abutment 53 provides an instantaneous seal, as in position 26 at the upper centerline, following which fluid from suction immediately enters the port and space 26 as the latter expands. Thus, it will be seen that full advantage is taken of the maximum displacement of the pump, and my advantage over the typical art is indicated by area X plus area Y in Fig. 8; X being the gain in displacement and Y the gain in filling action.

I will now proceed to describe the functioning of my invention as a variable volume pump by reference to Figs. 7, 9 and 10. Fig. 7 shows schematically some of the features previously covered in the description of Fig. 3; namely, in Fig. 7 we have a pump of the rotary gear type essentially represented by the housing 1, pinion 19, and ring gear 21, said gears rotating clockwise within a sleeve of three parts of which cross-section is taken through the central part 35. The cross-section shows ligaments or webs in the central portion of the sleeve 35, of which 53 forms the discharge abutment and 53' forms the suction abutment. The suction passage in the housing is indicated by 2, and the discharge passage by 3. It will be noted that sleeve 35 is cut away in the central part between the abutments 53 and 53' so as to form communication between the ring gear ports 25 and suction 2 and discharge 3. The central portion of housing 1 is arranged so that a seal is provided through contact of the central portion of its bore with the abutments and in such a way as to permit rotation of the abutments (as integral with 35) to a position 90 degrees or more from the centerline of the gear eccentricity, said centerline in this case being shown at an angle of about 45 degrees from the vertical to accommodate a desirable form of housing. It will be seen that this construction provides a balance between the action of discharge pressure against abutment 53 and the action of discharge pressure against abutment 53', resulting in no net turning moment except that of drag of the oil film on the sleeve in the direction of rotation of the ring gear, and some impingement of fluid against the abutments, both these effects being comparatively small. The balancing of the effect of discharge pressure and the utilization of the "drag" and "impingement" effects to advantage are features of this invention, as will be shown later. The resultant thrust toward the suction side in a direction at right angles to a line drawn through the centers of the abutments (caused by discharge pressure acting against the abutments) may be counteracted by hydraulic balancing provided by the oil grooves cut in the outer surface of the sleeve at 55 where this portion of the sleeve bears against the housing in a manner previously described. The balancing means is thus seen to shift as the reaction shifts due to rotation of the abutments and is automatically reactive to change in pressure, a feature of this invention.

A portion of the sleeve 35 is provided with gear teeth 36 which mesh with the teeth of the gear 38, mounted in the suction port of the pump. Gear 38 may be rotated by a shaft 39 which extends through the casting of the pump to the outside. An advantage obtained by mounting the gear 38 and shaft 39 on the suction side of the pump is that only a small stuffing box is required on this shaft sufficient to prevent leakage of air into the suction port 2 and the packing is thus not subject to high pressure in normal operation. It is anticipated that in some cases 38 and 39 might be mounted in the discharge passage or that rotation of the gears may be reversed, with suitable modification of details, so that the suction port 2 of the pump would then become the discharge port.

Continuing now with reference to Fig. 7, it will be seen that rotation of shaft 39 by external gearing and lever, as previously shown in Fig. 1, or other means, will cause gear 38 to be rotated; and, since 38 meshes with gear teeth 36 attached to sleeve 35, the sleeve will be rotated relative to housing 1, and the axis through the abutments 53 and 53' will be revolved to the position 0—0' in Fig. 9. As previously described, the position of the abutments shown in Fig. 7 is for maximum delivery, tooth space 28 being at a maximum and space 26 at a minimum. Intake will therefore occur from suction port 2 for 180 degrees of ring gear travel where space 27 represents an intermediate stage of the tooth space expansion; discharge will take place into port 3 for 180 degrees of ring gear travel where space 29 represents an intermediate stage of tooth space contraction. The suction filling and discharge are, of course, continuous as the gears revolve in the direction shown by the arrow.

Referring now to Fig. 9 where the axis through the abutments has been revolved to 0—0', it will be seen that 0—0' is revolved 90 degrees from the original centerline of maximum discharge coinciding with the line of eccentricity through the gear centers. It will be seen in Fig 9 that with the abutments in the position 0—0', abutment 53' is sealing off ring gear port 25 leading to tooth space 29. Since space 28 is at a maximum in the position shown, and since, as previously described, the tooth spaces on what was formerly the discharge side have been contracting in moving from position 28 to position 29, it is seen that as the space was filled with fluid in the position 28, fluid must have been discharged from the space in moving to position 29. Since the spaces are now connected with suction port 2 during this part of the rotation, the fluid discharged in this process is free to flow back to suction and reenter the tooth spaces on the suction side of position 28. Arrows in Fig. 9 indicates how this may occur from the tooth space between 28 and 29 to the tooth space between 27 and 28. In the gear position shown, these two aforementioned spaces, being symmetrically located with respect to the main centerline, are equal. Therefore, the fluid expelled from the one may be absorbed by the other, and as far as these spaces are concerned, no net change occurs in the amount of fluid present in suction port 2. In a similar manner it will be seen that abutment 53 is sealing off port 25 leading to space 27 in the position shown in Fig. 9. It will also be seen that the tooth spaces have been increasing from 26, which is at the minimum, to 27. In the position of the gears shown, the space between 26 and 27 is seen to communicate with discharge port 3 and to be symmetrically equal to the space between 29 and 26. Thus, fluid expelled from the latter may be absorbed by the former and no net increase in discharge fluid will occur. By reference to Fig. 8, in which the curve represents the variation in tooth space on the discharge side when read downward and on the suction side when read upward, it will be seen that space 27 is equal in volume to space 29 since both are at the 90 degree point of rotation. It will also be seen that the enlargement of the tooth space from the line 0—0' to the maximum 100 per cent at the top of the curve is equal to the contraction which occurs from the 100 per cent point down to the line 0—0'. This is true for all tooth spaces passing through this cycle. Similarly, the contraction of tooth space from 0—0' down to zero at the bottom of the curve is equal to the enlargement from zero up to 0—0', which is true for all tooth spaces passing through this cycle. From the above, it will be evident that when the abutments 53 and 53' are on the line 0—0', 90 degrees from the main centerline, space 27 is equal to space 29 and recirculation occurs on the suction side in passing through position 28, but no net change in volume results. Likewise, on the discharge side in passing through position 26, recirculation occurs but no net change in volume results. Therefore, since no net change in suction volume occurs and no net change in discharge volume occurs, there can be no net flow in either, and no flow through the pump from suction 2 to discharge 3. Therefore, the position shown in Fig. 9 is a position of shutoff, or no delivery.

It will be obvious that for any position of the abutments between that of maximum delivery shown in Fig. 7 and that of zero or minimum delivery shown in Fig. 9, there will be an unequal distribution of generated tooth space utilized on opposite sides of the main centerline. In other words, when the abutments move to the position shown in Fig. 10, the generated contraction of suction tooth space from position 28 to position 28' is less than the generated expansion of suction tooth space from position 26' to 28. Therefore, there is a net suction intake. Likewise the generated discharge tooth space expansion from position 26 to 26' is less than the generated discharge tooth space contraction from position 28' to position 26. Therefore, there is a positive net discharge volume. The net flow or delivery of the pump for the abutment position shown in Fig. 10 will be seen to be a quantity which is greater than zero but less than the maximum obtained with abutments on the centerline as in Fig. 7. The quantity of fluid delivered by the pump will be increased by moving the abutments closer to the position of Fig. 7 and decreased by moving the abutments closer to the position shown in Fig. 9. This change of volume of delivery may thus be accomplished in the subject invention by a smooth and continuous rotation of the sleeve 35, resulting in a smooth and continuous reduction or increase in volume of delivery, as desired, in contrast to a step by step increment of change, and any desired intermediate delivery may be selected.

Referring now to Fig. 11, a further feature of this invention and preferred construction will be shown. By movement of the abutments past the position 0—0' to the position shown in Fig. 11 where abutment 53 clears housing 1 by opening 57 and abutment 53' clears the housing by opening 58, a continuous passage for the flow of fluid is provided from discharge 3 to suction 2 through openings 57 and 58 and the connecting passages, as indicated by the long flow arrows in Fig. 11. In this situation with the gears continuing to rotate, there is a continuous recirculation of fluid to and from the tooth spaces on both the suction and discharge sides, as indicated by the short flow arrows. However, this recirculation has no appreciable effect on the main flow through the pump under this condition, and therefore it is of no importance whether or not the action in and out is symmetrical or balanced. The feature here emphasized is that since the rotating gears now have no appreciable effect and the pump housing 1 and the sleeve 35, carrying abutments 53 and 53' form controllable openings 57 and 58 by which the flow from 3 to 2 may be increased or decreased through manipulation of shaft 39 from the outside of the pump, this combination now constitutes a control valve by which the flow from the high pressure side, in this case 3, to the low pressure side, in this case 2, may be varied at will. This is a highly valuable feature because it permits a controllable reverse flow through the pump unit without the necessity of reversing the gears. This condition obtains in the preferred form when the discharge 3 is connected to another hydraulic unit, such as a fluid hoisting motor, on which there is a continuous load in the reverse direction which is normally overcome by delivered pump pressure but which during the operation, as described in Fig. 11, will tend to maintain a slight flow in the reverse direction through the pump from 3 to 2 when such flow is permitted by spaces 57 and 58 and said flow being caused, for instance, by the action of a load tending to unwind the cable from the hoisting drum, which in turn rotates the hoisting motor backwards.

Fig. 12 shows a hydraulic hoist system in which the fluid unit, subject of this invention, is employed in the manner just described. This system is peculiar to this invention because a fluid unit such as described must be employed in order to obtain the simple arrangement with the particular features shown. A constant speed electric motor 59 is directly coupled to and drives at constant speed the variable volume fluid unit 60 which is provided with a control lever 61. Discharge pipe 62 conducts fluid from 60 in the direction of the solid arrow to hydraulic motor 63, which is coupled to hoisting drum 64, on which hoisting cable 65 is wound. Cable 65 is passed through pulley blocks in any desired arrangement to support or raise and lower the load. Return fluid from motor 63 is conducted by pipe 66 to supply tank 67 and from there suction pipe 68 conducts fluid to the suction of the pump 60.

When control lever 61 is placed in "off" position, hoisting will cease; and when control lever 61 is placed in the valving position previously described in Fig. 11, the tension on cable 65 tends to reverse drum 64 and drive motor 63 backwards, and the direction of fluid flow and motion of the cable 65 permitting the load to travel downward are shown by the dotted arrows.

In common with all rotary fluid units, a very slight slippage of fluid through the capillary passages of the unit and through the gear teeth occurs at all times when there is a differential pressure across the unit. For this reason when lever 61 is in the "off" position and no flow in either direction would occur by volumetric displacement it is a fact that the load exerts a force through cable 65 tending to unwind from the drum, and thus maintains a static pressure in the reverse direction in fluid motor 63, which in turn is resisted by the transmission of fluid pressure through pipe 62 back to the pump 60. Owing to the slight leakage of fluid which will then occur, as mentioned above, the units will not be positively locked in position but will creep or very slowly rotate, permitting the load to descend.

To overcome this creep and lock the load in position when the lever 61 is in neutral, I propose the following arrangement. An electromagnetic brake 69 of a common commercial type may be applied, preferably to the drum. This brake is normally applied by spring 70 and is released when the brake coil is energized. A mechanically operated electric switch 71, of a common type, is mounted adjacent to lever 61 in such a manner that the actuating arm of the switch is engaged by lever 61, or some attached unit thereof, when 61 is in the "off" or neutral position, and thus opens the switch which is otherwise normally closed. Switch 71 being connected in series between the electric source 72 and the actuating coil of brake 69, the brake is thus de-energized when handle 61 is in the "off" position and brake application is made through the action of spring 70, thus holding the load stationary. During all other operations in either direction, switch 71 is not actuated, the brake coil is energized, and the brake released, permitting free action and control by the hydraulic system. I emphasize as one of the features of this system that control of the load is maintained without the necessity of reversing or stopping electric motor 59, without the use of a second pump to reverse hydraulic motor 63, without employing complicated reversing valves, and above all, is accomplished with a single control lever.

The previous detailed description of the embodiment of my invention in a variable volume fluid unit showed its application in preferred form to a unit in which there was a one tooth difference between the external and internal gears. In order to show that application of this invention is not restricted to gears of this type, I will demonstrate in Figs. 13 and 14 how I apply it to a unit having gears with a difference of three teeth, and for illustration I use the gear arrangement of a well-known commercial pump. In Fig. 13, without going into intricate details of the construction which would be similar to those previously described but adapted to fit the construction features of this design, I will show the peculiar arrangement of abutments which is required in this case and which is the only essential difference in the application. In Fig. 13 housing 73 is provided with suction port 74 and discharge port 75, said housing having an internal cylindrical bore in which a rotatable sleeve 76, carrying abutments or ligaments 77 and 77', is similar to the one previously described. The abutments are here shown not as of their actual width but as of their effective width, since the former cannot be readily shown in this view. The annular leading and lagging edges of the abutments would be arranged in accordance with the same principle as was previously shown in Fig. 6. In this type of pump, a segment 78 is provided to form a seal between internal gear 79 and external gear 80 at their points of greatest separation and 78 is commonly referred to as a half-moon abutment and is affixed to housing 73 so that it is stationary relative to the gears. Direction of rotation of the gears is shown by the arrow. The manner in which this pump functions is well known in the art and will not be described here. The controlling gear, located in suction port 74 and which is controlled by previously described means external to the pump, is here shown as 81. The main centerline of eccentricity of the gears is here shown as normally employed in this pump so that the view will be more readily recognized; however, in actual construction a more efficient discharge passage would be obtained with the main centerline rotated approximately 45 degrees counterclockwise, as shown in previous figures. In Fig. 13, the discharge abutment 77 is located on the centerline at the point of minimum tooth space for the position of maximum delivery being illustrated. The suction abutment 77', however, is located in such a manner as to relieve port 82 to discharge at the same instant that segment 78 relieves the same port on that side. The position shown in Fig. 13 is therefore the one for maximum discharge in which the abutments 77 and 77' have no effect on the quantity delivered.

In Fig. 14 I show the revolved position of my sleeve 76 and abutments 77 and 77' at the setting for minimum or zero delivery. It will be seen that the two abutments are now symmetrically located with respect to the main centerline and therefore recirculation occurs in discharge and suction passages, in and out of the symmetrically located equal spaces, as indicated by arrows, and no delivery results.

By reference to Figs. 15 and 16, there is shown a hydraulic system which I propose for use where reversible variable speed power control is required, such as for instance in hoisting service where the load will not "overhaul" and power must be applied both to raise and lower the load. Referring to Fig. 15, 83 and 84 are variable volume delivery fluid units, subject of my invention, as previously described, but do not necessarily include the valving feature for reverse flow. Units 83 and 84 are assembled with control levers 85 and 86 on opposite ends of the assemblies, respectively, so that the two units may be joined with coupling 87, and control levers 85 and 86 will be adjacent to each other. A constant speed non-reversible electric motor, or other power means, may be connected to coupling 88 and will thus drive both units 83 and 84 in the same direction at constant speed. To illustrate how the hydraulic power will be applied in the forward or "up" direction, the fluid flow is indicated by the solid arrows. Assume that control lever 85 is placed in a position for some delivery from pump 83 while control lever 86 is in the "off" position and pump 84 is not delivering fluid. Fluid from supply tank 89 will flow to the inlet port of 83 through pipe 90 and will be discharged through pipe 91 to automatic valve 92, which is a simple spring loaded two-way piston valve arranged so that fluid pressure will move the piston against the spring and open communication between pipes 91 and 93, permitting fluid under pressure to flow into hydraulic motor 94, rotating 94 in the forward direction. Discharge fluid from 94 returns through pipe 95, through automatic piston valve 96 to tank 89 and/or suction pipe 90. Valve 96 is held in the deenergized position by the spring action since there is no fluid pressure on the end of the piston. Tank 89 is preferably a closed tank partly filled with fluid so that an air chamber exists within the tank allowing for expansion and contraction of the fluid in the system. Hence, the fluid system is kept full of liquid automatically by make-up liquid from the tank, and air is excluded from the system. With this arrangement, the fluid medium is constantly recirculated in the system, and if used continuously will become heated; in that case coolers may be provided at suitable points in the system but are not shown here.

Next to be described is the action of the system in the reverse direction for lowering the load. The flow of fluid in this case is indicated by dotted arrows and dotted positions of the valves. Assuming control lever 85 to be in the "off" position and control lever 86 to be advanced for fluid delivery from pump 84, fluid from tank 97 enters pump 84 through pipe 98 and discharges through pipe 99, valve 96, and to the hydraulic motor through pipe 95, driving the motor in the reverse or "lowering" rotation. Discharge from 94 passes through 93, valve 92, which is now in the deenergized position, and returns to tank 97 and/or pipe 96, tank 97 being similar to tank 89. In order to prevent "creep" of motor 94, an electric brake 100, of a common type, is employed. Brake 100 is commonly applied by springs and is released by energizing the coils, which in this case will be connected electrically through two electric switches of a common type, one of which is mounted as previously shown in Fig. 12 so that it will be mechanically opened by lever 85 when the latter is in the "off" position, and the other mounted so that lever 86 will mechanically open it when in the "off" position. These switches are electrically connected in parallel. Thus, when both 85 and 86 are in the "off" position, the brake is deenergized and motor 94 is locked. Movement of either 85 or 86 to raise or lower the load at the same time mechanically releases one of the control switches, closing the circuit to the brake and releasing the brake, whereupon the motor can be turned by the application of fluid power. If preferred the control switches may obviously be actuated by the valves 92 and 96 instead of by the levers 85 and 86.

I also propose an alternative braking arrangement in that valves 92 and 96 may obviously be provided with extension rods connected to a normally spring closed brake on the hoisting motor in such a way as to provide a hydraulic release instead of electric release of the brake thereby eliminating the electric brake and switches entirely.

In order that faulty operation of the system shall be prevented, I insure that neither lever 85 nor lever 86 can be moved from the "off" position unless the other lever is in the "off" position. This I accomplish by means of a mechanical interlock 101, shown in greater detail in Fig. 16, where 83 and 84 are the variable volume pump units as before, and 87 is the coupling between them. Lever 85 which controls pump 83 is shown in the "off" position and lever 86 which controls pump 84 is at the same time in an advanced position. To describe the action of the mechanical interlock, I show interlock rod 101 which is passed through hole 102 in bracket 103 suitably affixed to pump 83, and corresponding hole 104 in bracket 105 affixed to pump 84, rod 101 having slight clearance in holes 102 and 104 so that it may slide axially. In lever 85, I provide a depression 106 to accommodate the rounded or beveled end of rod 101. Rod 101 is of such length that when its one end extends into the depression 106, its opposite end has only sliding clearance on a portion of lever 86, as shown at 107. It will be seen that in the arrangement shown in Fig. 16, with interlock rod 101 in the position shown therein, lever 85 is restrained from movement by the engagement of the end of rod 101 in depression 106, any disengagement of these parts being prevented by contact at point 107; similarly, there is a depression provided in lever 86 so that when it is in the "off" position the end of interlock rod 101 may enter and engage the depression. When both levers 85 and 86 are in the "off" position, rod 101 may be forced into either depression by moving the opposite lever from the "off" position, causing 101 to be driven out of the corresponding depression, as 106, and forced and locked into the opposite depression on the other control lever.

It will be seen from the foregoing that I propose a variable fluid control system and an interlock system which are not only foolproof in operation but offer several other advantages. Variable, controllable power is provided in two directions with a single electric motor or other prime mover, which prime mover may run at constant speed and in one direction only, thus eliminating expensive reversing and speed controls on the latter. My system offers positive control of the load at all times in both directions and prevents "creep" when power is not applied. In a hoisting system only two levers are required for operation and no brake lever is required. There is no danger of reversing the application of power by accidentally going through the neutral position with the control lever. No separate reversing valve is required, which is a bulky and expensive item for use on the high pressure fluid. Reversing cannot be accomplished without passing through the "off" position, thus insuring against damage to the equipment. Duplicate variable hydraulic pump units are employed which may be used elsewhere singly and assembled for control or driving from either end. With this system, also, a minimum of power is consumed when in the "off" position since there is no delivery and no by-passing of fluid or external recirculation.

What I claim is:

1. In a rotary fluid unit of the radial ported internal gear type providing displacement generating cavities by meshing relationship of the gear teeth, an adjustable abutment positioned between the high pressure and low pressure fluid, said abutment extending across the gear ports angularly with respect thereto, thereby providing gradual transition between the suction and discharge fluid phases as the ports rotate past the abutment, the sealing surface provided by said abutment being such that it does not completely obstruct a port in any position relative thereto.

2. In a rotary fluid unit of the radial ported internal gear type having a ported ring gear and an internal, eccentrically mounted pinion in mesh therewith, a non-cavitating, non-trapping abutment in sealing contact with the periphery of the ring gear between high pressure and low pressure fluid, the said abutment being arranged with its longitudinal axis angularly disposed with respect to the longitudinal axes of the ring gear ports and of a width permitting uncovering of a port at one end as the other end of the port is being covered, whereby the port is not completely obstructed in any position and in passing the abutment both entry and egress of fluid are permitted in gradual transition between the suction and discharge fluid phases.

3. In a rotary fluid unit of the radial ported internal gear type having an enclosed ring gear and eccentrically mounted pinion in mesh therewith, the ports in the ring gear being elongated, an abutment located between the outer periphery of the ring gear and its enclosure as a seal between the fluid suction and discharge phases of the unit, the leading edge of said abutment being defined by a line extending from one extremity of the centerline of one ring gear port to the opposite extremity of the centerline of the succeeding ring gear port, and the lagging edge of said abutment being defined by a line extending from the opposite end of said first centerline to the alternate end of the centerline of the preceding ring gear port, whereby the abutment constitutes a diagonal web of such width that the ports in passing the same are not completely obstructed in any position but provide for gradual transition between the suction and discharge fluid phases, thereby to obviate cavitation and trapping within the displacement generating cavities of the gears.

4. In a rotary fluid unit of the radial ported internal gear type providing displacement generating cavities by meshing relationship of the gear teeth, means for continuously driving the same, a rotatable sleeve member surrounding the outer gear with running fit and formed of spaced side rings and two connecting web portions constituting abutments which extend across the gear ports angularly with respect thereto, the abutments being so arranged that the differential pressure between discharge fluid and suction fluid acting tangentially against the face of one abutment is opposed by the same differential pressure acting tangentially against the face of the other, whereby the opposing forces nullify each other and do not result in the application of torque to the rotatable sleeve, and means for rotating said sleeve and varying the positions of said abutments thereby to vary the volume of fluid discharge without varying the speed of drive of the unit.

5. In a rotary fluid unit of the radial ported internal gear type providing displacement generating cavities by meshing relationship of the gear teeth, a rotatable sleeve member surrounding the outer gear with running fit and formed of spaced side rings and two connecting web portions extending therebetween across the gear ports to provide abutments between the pressure and suction sides of the unit, a housing confining said rotating sleeve, grooves formed in the outer peripheries of the side rings of said sleeve to define fluid passages communicating with the pressure side of said unit and extending to the suction side without communicating therewith, thereby essentially to balance the diametral thrust of said sleeve resulting from the differential pressure between discharge fluid and suction fluid acting thereon, and to float and lubricate said sleeve regardless of operational position or pressure, and means for rotating said sleeve to position the abutments variously with respect to the full mesh centerline of said gears.

6. A rotary fluid unit comprising a housing having an inlet and outlet, an internally toothed ring gear rotatably mounted in said housing and supported therein by spaced cylindrical bearings, a cylindrical sleeve rotatably mounted upon the outer periphery of the ring gear and retained between said spaced cylindrical bearings, said sleeve comprising spaced rings and connecting webs, said webs serving as abutments sealing between the fluid suction and discharge phases of said unit, ports in said ring gear communicating with the space between the rings of said sleeve and in rotation passing the abutments provided by said webs, means for rotating said sleeve within said housing to position the abutments circumferentially with respect to said ring gear, an eccentrically mounted pinion in mesh with said ring gear, and a shaft extending into said housing for driving said pinion and ring gear.

7. A rotary fluid unit comprising a housing having an inlet and outlet, an internally toothed ring gear rotatably mounted in said housing, a rotatable sleeve between the exterior periphery of said ring gear and housing positioned to overlie ports in the ring gear which communicate with the tooth spaces thereof, said rotatable sleeve comprising spaced rings with connecting webs which extend diagonally of the axes of the ports, said webs constituting abutments separating the suction and pressure sides of the unit, grooves formed in the spaced rings to admit pressure fluid between the rings and housing thereby essentially to balance the diametral thrust of said sleeve resulting from the differential pressure between discharge fluid and suction fluid acting thereon, and to float and lubricate said sleeve regardless of operational position or pressure, toothed racks carried by said side rings, gear means in mesh therewith mounted on a shaft extending to the exterior of said housing, means exterior of said housing for rotating said shaft to vary the position of said rotatable sleeve and the abutments thereof, and a drive shaft extending into said housing, mounting a pinion eccentrically with respect to the rotational axis of said ring gear, said pinion meshing with the ring gear and in its rotation providing displacement generating cavities communicating with the ring gear ports.

8. In a rotary fluid unit of the internal gear type providing displacement generating cavities by meshing relationship of the gear teeth and having ports in the outer gear extending outwardly from such cavities, spaced abutments arranged in the path of such ports and constituting a barrier between the suction and pressure phases of the unit, and means for moving said abutments to various positions circumferentially with respect to the outer gear, to control and regulate net volumetric displacement through simultaneous recirculation of part or all of the fluid in the suction phase and in the pressure phase, thereby to reduce discharge pressure under constant load, and under back pressure exceeding that of the discharge to permit reverse flow with continued rotation of the gears at constant speed in the original direction.

9. A fluid system comprising in combination, a rotary fluid unit of the internal gear type having ports in the outer gear thereof communicating with the displacement generating cavities formed by meshing relationship of the gear teeth, and having spaced abutments constituting barriers between the suction and discharge phases of the unit, means for constantly driving the gearing of said unit in one direction, a hydraulic motor actuated by fluid discharged under pressure from said unit, means operated by said hydraulic motor for performing work on a load which is exerted in a direction tending to reverse the direction of flow of fluid in said system, and means for moving said abutments of the rotary fluid unit circumferentially with respect to the outer gear thereof to vary the net volumetric displacement and, by thus reducing the discharge pressure, to permit reverse flow under pressure exerted by the load, with continued rotation of the fluid unit gears at constant speed in the original direction.

10. A fluid system comprising in combination, a rotary fluid unit of the internal gear type having ports in the outer gear thereof communicating with the displacement generating cavities formed by meshing relationship of the gear teeth, and having spaced abutments constituting barriers between the suction and discharge phases of the unit, means for constantly driving the gearing of said unit in one direction, a hydraulic motor actuated by fluid discharged under pressure from said unit, means operated by said hydraulic motor for performing work on a load which is exerted in a direction tending to reverse the direction of flow of fluid in said system, control means for moving said abutments of the rotary fluid unit circumferentially with respect to the outer gear thereof to vary the net volumetric displacement by recirculating fluid in both the suction and pressure phases, a brake for the hydraulic motor operated means, actuated when the position of said control means is such that the discharge pressure and volume of said unit is only sufficient substantially to balance back pressure and fluid slip in the system imposed by the load, said brake being released upon further movement of said control means to a position wherein back pressure and fluid slip exceed the net volumetric displacement and pressure of the rotary fluid unit, thereby permitting reverse flow of fluid through said unit without altering the direction or speed of its drive.

11. A fluid system comprising in combination, a rotary fluid unit of the internal gear type having ports in the outer gear thereof communicating with the displacement generating cavities formed by meshing relationship of the gear teeth, and having spaced abutments constituting barriers between the suction and discharge phases of the unit, means for constantly driving the gearing of said unit in one direction, a hydraulic motor actuated by fluid discharged under pressure from said unit, a hoisting drum coupled to said motor in such manner that reversal of its rotation causes reversal of flow of fluid in said system, control means for moving said abutments of the rotary fluid unit circumferentially with respect to the outer gear thereof to vary the net volumetric displacement by recirculating fluid in varying degrees in both the suction and pressure phases, a switch actuated by movement of said control means to a position in which the abutments cause fluid to be discharged from the fluid unit at a rate substantially equalling the fluid displacement by back pressure on the system transmitted through said drum and hydraulic motor, an electromagnetic brake applied to the said drum upon actuation of said switch, and released upon movement of said control means to a position wherein fluid slip in the system exceeds the net volumetric displacement of the fluid unit, thereby permitting reverse flow of fluid through said unit without altering the direction or speed of its drive.

12. A fluid system comprising in combination, a hydraulic motor operated in reverse direction by reverse flows of fluid therethrough, a pair of rotary fluid units of the internal gear type having ports in the outer gears thereof communicating with the displacement generating cavities formed by meshing relationship of the gear teeth, spaced abutments in each such unit constituting barriers between its suction and pressure phases, means for coupling said units in tandem and means for driving the same simultaneously and continuously at constant speed, discharge piping connecting said units individually to said hydraulic motor for driving it in reverse directions, a spring biased valve in the piping leading from each unit to the hydraulic motor and adapted to open under spring loading when fluid is discharged to the motor, but upon closing to establish communication between said hydraulic motor and a fluid supply tank for the other unit, control means for moving the abutments of each rotary fluid unit circumferentially with respect to the outer gears thereof to vary the net volumertic displacements of each unit individually, and by recirculating fluid in both the suction and pressure phases of each unit, alternately reducing the discharge of one such unit sufficiently to permit the spring biased valve associated therewith to close and increasing the discharge of the other such unit to open the other spring biased valve, thereby alternately reversing flows through said hydraulic motor are established.

13. A fluid system comprising in combination, a hydraulic motor operated in reverse directions by reverse flows of fluid therethrough, a pair of rotary fluid units of the internal gear type having ports in the outer gears thereof communicating with the displacement generating cavities formed by meshing relationship of the gear teeth, spaced abutments in each such unit constituting barriers between its suction and pressure phases, means for coupling said units in tandem and means for driving the same simultaneously and continuously at constant speed, piping connecting said units individually to said hydraulic motor to drive it in reverse directions, a control lever for each unit operating to position the respective spaced abutments circumferentially with repsect to the outer gears thereof to vary the net volumetric displacement of each unit and thereby to control the discharge therefrom for driving said hydraulic motor in either direction, a rod of overall length greater than the distance between said control levers, guide means for said rod permitting its endwise movement in either direction, each lever being formed with an identation adapted to receive one end of the rod when the lever is in neutral position wherein the abutments of its respective unit are so located as to produce zero discharge of fluid, whereby endwise shifting of said rod affords clearance for actuation of the other control lever, but prevents movement of the first lever until the other is in position to permit movement of the rod into the indentation therein.

EDWARD TOPANELIAN, Jr.

REFERENCES CITED

The following references are of record in the file of this patent:

UNITED STATES PATENTS

| Number | Name | Date |
|---|---|---|
| 1,482,807 | Newberg | Feb. 5, 1924 |
| 1,660,464 | Wilsey | Feb. 28, 1928 |
| 2,321,880 | Vickers | June 15, 1943 |
| 2,414,197 | Gignoux | Jan. 14, 1947 |
| 2,416,801 | Robinson | Mar. 4, 1947 |

FOREIGN PATENTS

| Number | Country | Date |
|---|---|---|
| 26,279 | Great Britain | Nov. 15, 1912 |